United States Patent
Apitz (10) Patent No.: US 11,381,052 B2
(45) Date of Patent: Jul. 5, 2022

(54) LASER DEVICE (71) Applicant: SCHOTT AG, Mainz (DE)

(72) Inventor: Dirk Apitz, Lausanne (CH)

(73) Assignee: SCHOTT AG, Mainz (DE)

( * ) Notice: Subject to any disclaimer, the term of this patent is extended or adjusted under 35 U.S.C. 154(b) by 43 days.

(21) Appl. No.: 16/697,564

(22) Filed: Nov. 27, 2019

(65) Prior Publication Data
US 2020/0244030 A1 Jul. 30, 2020

(30) Foreign Application Priority Data

Nov. 29, 2018 (DE) ................ DE10 2018 130 390.4

(51) Int. Cl.
H01S 3/06 (2006.01)
H01S 3/094 (2006.01)
H01S 3/17 (2006.01)

(52) U.S. Cl.
CPC .......... *H01S 3/0604* (2013.01); *H01S 3/0619* (2013.01); *H01S 3/094* (2013.01); *H01S 3/175* (2013.01)

(58) Field of Classification Search
CPC ...... H01S 3/0604; H01S 3/0619; H01S 3/094; H01S 3/175; H01S 3/042; H01S 3/0405
See application file for complete search history.

(56) References Cited

U.S. PATENT DOCUMENTS

| 4,929,387 | A | 5/1990 | Hayden |
| 5,032,315 | A | 7/1991 | Hayden |
| 5,173,456 | A | 12/1992 | Hayden |
| 5,526,369 | A | 6/1996 | Hayden |
| 5,846,638 | A | 12/1998 | Meissner |
| 6,101,201 | A * | 8/2000 | Hargis ................. H01S 3/0627 372/107 |
| 7,163,904 | B2 | 1/2007 | Grün |
| 8,379,680 | B1 | 2/2013 | Sumida |
| 2005/0074040 | A1 | 4/2005 | Spence |
| 2005/0094689 | A1 | 5/2005 | Ludewigt |
| 2008/0247425 | A1* | 10/2008 | Welford ................. H01S 3/113 372/10 |
| 2010/0113245 | A1 | 5/2010 | Margaryan |

(Continued)

FOREIGN PATENT DOCUMENTS

| DE | 10219004 | 11/2003 |
| DE | 10355216 | 1/2005 |

(Continued)

*Primary Examiner* — Michael Carter
(74) *Attorney, Agent, or Firm* — Ohlandt, Greeley, Ruggiero & Perle, L.L.P.

(57) ABSTRACT

A laser device is provided that includes an element made of laser-active material and a cladding element bonded to the element so as to allow heat exchange by heat conduction between the cladding element and the element. The laser-active material emitting laser light when excited by pump light. The element being made of a glass. The cladding element being made of a material that exhibits an absorption coefficient for the pump light that is lower than a corresponding absorption coefficient of the glass. The element and cladding element being configured so that the pump light can be directed through the cladding element into the element and/or so that the pump light can be directed through the element into the cladding element.

18 Claims, 4 Drawing Sheets

(56) References Cited

U.S. PATENT DOCUMENTS

| | | |
|---|---|---|
| 2012/0165178 A1 | 6/2012 | Ritter |
| 2013/0344343 A1 | 12/2013 | Schreder |
| 2015/0103855 A1 | 4/2015 | Wechsler |
| 2017/0217828 A1 | 8/2017 | George |
| 2018/0312424 A1 | 11/2018 | Schreder |
| 2019/0033499 A1* | 1/2019 | Van Berkel .......... G02B 5/0891 |

FOREIGN PATENT DOCUMENTS

| | | | |
|---|---|---|---|
| DE | 102011056873 | | 6/2012 |
| DE | 102012210552 | | 12/2013 |
| DE | 102017207253 | | 6/2018 |
| EP | 1714948 | | 10/2006 |
| EP | 1978611 | | 10/2008 |
| JP | H03145776 | * | 6/1991 |

* cited by examiner

LASER DEVICE

CROSS REFERENCE TO RELATED APPLICATIONS

This application claims benefit under 35 USC § 119 of German Application 10 2018 130 390.4 filed Nov. 29, 2018, the entire contents of which are incorporated herein by reference.

BACKGROUND

1. Field of the Invention

The invention relates to a laser device.

2. Description of Related Art

A laser device basically consists of three components, an active medium or laser-active material, an excitation source, and a resonator.

In the active medium, photons are produced by optical transition of excited atoms or molecules into an energetically more favorable state. A crucial condition for a laser-active material is that population inversion can be established. This means that the upper state of the optical transition is occupied with a higher probability than the lower state. Such an active medium or laser-active material must have at least three levels and may be gaseous such as carbon dioxide, liquid such as dye solutions, or solid such as a crystal or glass.

The laser-active material may be doped with foreign ions which constitute the actual active medium of solid-state lasers. The electron levels of these (foreign) ions used for lasing are in the d orbital, such as in the case of titanium or chromium ions, or in the f orbital, such as in the case of neodymium, erbium, or ytterbium ions. These orbitals are not involved in chemical bonds. Therefore, the carrier material, mostly a glass or (single) crystal, has only a minor influence on the laser properties of the ions. In order to achieve an energy intake in the active medium, electrons must be raised to a higher energy level. This process is called pumping.

In order to induce a population inversion, energy must be pumped into the laser-active material. In order to prevent this pumping process from competing with stimulated emission, it must be based on another quantum mechanical transition. The pumping may be achieved optically, for example through irradiation of light, or electrically, for example through gas discharge or using electric current in laser diodes, in order to bring the atoms or molecules of the laser medium into excited states. In order to start a practical laser process, the energy need to remain stored within the laser medium until it is released by induced or stimulated emission and the electrons involved fall back to a lower energy level. In order to be able to efficiently produce a necessary so-called population inversion, with more electrons residing on the higher of the two involved energy levels than on the lower one, it is common to use materials and pump wavelengths such that the upper one of the two involved levels is a so-called metastable level, the electrons are pumped to an even higher level, spontaneously fall down to the metastable level to fill it and then, after the laser process, fall down from the lower level involved to an even lower ground level as quickly as possible. So, in order to efficiently achieve a population inversion, more energy levels and further transitions are usually necessary, in which energy is released which is not exploitable for the laser process. Thus, a pumping and subsequent laser process cannot achieve 100% efficiency by any means, and much of the unused energy is released in the laser material, for example through phonons in the form of heat. The laser material heats up. Such heating may directly decrease the efficiency of the laser process, since the electrons will be in a different energetic equilibrium at a different temperature. Also, so-called thermal lenses may have a mayor impact. In this case, an optical component does not heat up homogeneously, and due to thermal expansion or the temperature dependence of the refractive index, an additional optically relevant lens is formed, which unfavorably alters the beam properties of the laser.

A resonator, in the simplest case, consists of two parallel mirrors between which the laser-active material is located. Photons that propagate perpendicular to the mirrors will remain in the resonator and can therefore trigger or stimulate the emission of further photons in the active medium. A photon produced in this way will correspond to the triggering photon in all quantum numbers. Accordingly, photons that leave the resonator do not stimulate emissions. This selection of the resonator results in the narrow-band emission or high coherence length of laser radiation.

In laser systems which in particular include a solid-state laser-active material, heat is often generated in the solid, which must be dissipated. However, liquids that dissipate heat, such as water, are difficult to integrate especially in compact, small, possibly even mobile laser systems. A metallic heat sink can only be attached to lateral faces and is usually not very efficient for disk lasers.

Moreover, some laser-active materials are hygroscopic and water-soluble, so that their surface quickly degrades in air humidity or in water and often requires special protection. A protection that shields against climatic influences would significantly increase the service life of such laser systems or simplify protective measures and cleaning before and during assembly.

The chemical resistance of polished glass surfaces also depends on the composition of the glass.

Climate resistance describes the behavior of glasses under high relative humidity and high temperatures. In sensitive glasses, a blotchy haze may arise on the surface that generally cannot be removed by wiping.

Phosphate glass exhibits low thermal conductivity, a large thermal expansion coefficient, and low breaking strength, it is hygroscopic, water-soluble, and climatically unstable. In laser applications involving phosphate glass such as, e.g., LG750, LG760, LG770, APG1, BLG760, LG940, LG950, LG960 (available from SCHOTT AG), these are negative characteristics.

SUMMARY

The invention is therefore based on the object to provide a laser device which provides improved heat dissipation for a laser-active material, in particular a laser glass, in particular a phosphate glass. In a preferred implementation, the laser medium should exhibit improved chemical resistance, in particular improved climate resistance and water resistance, compared to a phosphate-based laser glass.

For this purpose, the laser device comprises an element made of laser-active material which emits laser light when excited by pump light, wherein the laser-active material is preferably a glass, and wherein at least one cladding element is bonded to the element made of laser-active material in a manner so as to allow heat exchange by heat conduction between the cladding element and the element made of laser-active material, and wherein the materials of the cladding element and of the element made of laser-active material differ in that the cladding element exhibits an absorption coefficient for the pump light, which is lower than the corresponding absorption coefficient of the element made of laser-active material, and wherein the laser device is designed so that the pump light can be directed through the cladding element and into the element made of laser-active material and/or so that the pump light can be directed through the element made of laser-active material and into the cladding element.

In this way, the laser device at the same time also provides for an undisturbed conduction of the laser light.

In a preferred embodiment, the element made of laser-active material may be polished so as to be plane-parallel, allowing both pump light and laser light to pass through the two polished surfaces, and a likewise polished plane-parallel cladding element may be attached on each one of the polished boundary faces.

In another preferred embodiment, the element made of laser-active material may be polished to be plane-parallel, and one of the two surfaces may be rendered mirroring and applied to a heat sink. In this case, both pump light and laser light passes through the other polished surface and is reflected at the mirroring surface. A likewise plane-parallel polished cladding element may be attached on this second polished interface. The heat sink may either be made of a material with very good thermal conductivity such as a metal, in particular copper, and cool in a passive manner, or else the heat sink may be cooled actively, for example using water or Peltier elements.

In order to be effective as a heat sink or as a connecting member to a laterally mounted heat sink, the cladding element advantageously exhibits a higher thermal conductivity than air or than a protective gas. Thus, the at least one cladding element is capable of dissipating the heat away from the element made of laser-active material.

The cladding element is thermally advantageous if it exhibits at least a similar or preferably higher thermal conductivity than the element made of laser-active material.

For an optimum bond between the at least one cladding element and the element made of laser-active material, the thermal expansion coefficients of the materials of the cladding element and of the element made of laser-active material, i.e. the laser glass, are advantageously similar, preferably the difference is less than 20%, most preferably less than 10%.

In order to ensure transparency for the laser light, the refractive index is preferably similar, that is to say a difference between the refractive indices of the materials of the cladding element and of the element made of laser-active material is preferably less than 0.1, more preferably less than 0.05, and most preferably less than 0.002.

The element made of laser-active material is preferably made of phosphate glass, that is a phosphate-based glass.

Phosphate-based glasses that were developed for high-power applications to meet the requirements of high-power solid-state laser systems include the glass types LG750, LG760, and LG770 (available from SCHOTT AG). All three types of glass have a large cross section and a low nonlinear refractive index. All are free of metallic platinum particles and other inclusions that could cause damage to the laser.

APG-1 (available from SCHOTT AG) is a phosphate glass for elevated power and ultra-short pulse applications with improved thermo-mechanical properties that are desirable for applications with high average power. The broad emission bandwidth of these materials is exploited in laser systems with pulses in the femtosecond range. The lower cross section and long service life at low emission concentration make this glass particularly interesting for applications that are limited due to increased stimulated emissions or intended for excitation by diode lasers.

APG-760 (available from SCHOTT AG) is a phosphate laser glass for high-power applications at 1 micrometer with improved thermo-mechanical properties. It is recommended for use as an active material in laser systems with high repetition rates.

In a preferred embodiment, the element made of laser-active material is doped with ions of one or more of the elements erbium, ytterbium, neodymium, chromium, cerium, and/or titanium. These foreign ions are the actual active medium of the solid-state laser.

LG940, LG950, and LG960 (available from SCHOTT AG) are "eye-safe" phosphate laser glasses for 1.5 micrometer emission. These erbium and ytterbium ion doped phosphate glasses are used in flash lamp or diode pumped laser systems. They have very low refractive indices, good thermal properties and a very high emission cross section. Typical applications are laser distance measurements and medical lasers.

LG940 is an erbium-ytterbium-chromium-cerium-doped phosphate laser glass.

LG950 is a phosphate laser glass doped with erbium and ytterbium ions.

Phosphate glasses generally offer higher solubility for rare earth dopants so that the amount of active ions can be significantly increased.

Suitable base glasses are phosphate or fluorophosphate glasses which preferably have a $P_2O_5$ content of at least 50 wt %, more preferably of at least 55 wt %, in some embodiments even 80 wt % or 85 wt % at most. Furthermore, the glasses may contain $Al_2O_3$ preferably in an amount of at least 1 wt %, more preferably at least 2 wt %, and/or preferably not more than 20 wt %. Further constituents that may be contained in the phosphate glasses include fluorine in an amount of preferably more than 0 up to 30 wt %, one or more alkali metal oxides ($Li_2O$, $Na_2O$, $K_2O$, preferably 0 to 20 wt % in total), alkaline earth metal oxides (MgO, CaO, BaO, SrO, preferably 0 to 40 wt % in total), and/or oxides of the elements Si, B, Zn, La, Gd, Nb, Y, Yb, Bi, Ge, and/or Pb. Such glasses are described, for example, in the documents US 2017/0217828, U.S. Pat. Nos. 5,526,369, 5,032,315, 5,173,456, 4,929,387, EP 1 714 948 A2, DE 10 2011 056 873, DE 10 2012 210 552, and DE 10 2017 207 253, the disclosure of which shall be considered to be fully incorporated into the present description.

By way of example, base glasses appropriate for the present invention have the following composition, in percent by weight:

| | |
|---|---|
| $P_2O_5$ | 25-75 |
| $Al_2O_3$ | 0.5-15 |
| MgO | 0-10 |
| CaO | 0-16 |
| BaO | 0-30 |
| SrO | 0-16 |
| ZnO | 0-10 |
| $Li_2O$ | 0-13 |
| $Na_2O$ | 0-10 |
| $K_2O$ | 0-11 |
| $\Sigma$ RO (R = Mg, Ca, Sr, Ba) | >0-40 |
| $\Sigma$ $R_2O$ (R = Li, Na, K) | >0-20 |
| $F/F_2$ | 0-30. |

In addition to the constituents of the base glass mentioned above, laser glasses furthermore contain laser-active components, e.g. ytterbium ions and/or erbium ions (e.g. in the glasses LG960, LG950, and LG940 manufactured by SCHOTT AG), neodymium ions (e.g. Nd:YAG, SCHOTT glasses APG1, APG760, LG680, LG750, LG760, LG770), chromium ions, and/or cobalt ions.

The one or more cladding element(s) may be made of disordered materials such as glasses, as well as of ordered materials such as crystals.

In order to prevent heat from being generated in the cladding element due to a laser process or absorption process, the cladding element is preferably not doped with and preferably does not contain any laser light emitting ions or pump light absorbing ions such as ions of the elements erbium, ytterbium, neodymium, chromium, cerium, and/or titanium.

Preferably, the cladding element comprises a phosphate crown glass or borosilicate crown glass. These types of glass have a low refractive index, i.e. a refractive index $n_d$ of preferably less than 1.55, more preferably less than 1.54, and/or greater than 1.45, preferably greater than 1.47.

N-BK7 borosilicate crown glass (manufactured by SCHOTT AG) is a very pure, universal optical glass which is described in U.S. Pat. No. 7,163,904, for example. It is one of the most common glasses that are used to make high-quality optical components, especially in the visible spectrum. The relatively hard boron crown glass with a refractive index $n_d$ of 1.5168 contains very few inclusions and is virtually free of bubbles.

A common technical reason for using N-BK7 is its high optical quality. Its uniform transmission and low absorption in the entire visible wavelength range are a key feature for many optical applications. Due to its stable chemical properties and high stain resistance, no special treatment is required for N-BK7 prior to sanding and polishing.

For special climatic resistance, the cladding element preferably comprises fluorine ions, according to one embodiment. In particular, the cladding element may comprise a fluorophosphate glass.

In addition, the cladding element may advantageously have a coating, in particular an anti-reflection coating.

The element made of laser-active material may preferably also have a coating, on the side facing away from the cladding element, in particular a coating which renders reflective the respective side, at least partly, for the laser light or for the pump light or for both, i.e. so as to substantially completely reflect the light.

Furthermore, the cladding element, in particular the glass and/or coating thereof, such as an anti-reflection coating, preferably has a laser damage threshold that is higher than that of the element made of laser-active material or at least high enough so as to prevent damage from occurring during operation of the laser component. If the component is operated with the correct choice of polarization direction of the laser light and at the Brewster angle, then an anti-reflection coating will not be necessary.

Advantageously, the cladding element is bonded to the element made of laser-active material by optical bonding, in particular using an adhesive matched in refractive index, preferably a two-component epoxy adhesive, or by anodic bonding, or by optical contact bonding.

The optical bonding of the cladding element may be achieved using various techniques: For example, the bonding may be achieved using an adhesive having a refractive index matched to that of the surface of the element of laser-active material or the glass thereof, such as silicone or a two-component epoxy adhesive. A drawback of this technique is the comparatively low laser induced damage threshold (LIDT) of organic substances compared to inorganic glasses. In applications intended for very high pulse energies with very short pulse durations, it may therefore be advantageous to choose a direct bonding process such as direct optical contact bonding or anodic bonding.

The key properties of silicone such as low conductivity and chemical reactivity, thermal stability, and the ability to repel water and to establish watertight seals make it a common solution for optical bonding. Epoxy resin, when used as a structural adhesive, forms a stronger bond than silicone, thus preventing the formation of particulate residues.

Anodic bonding is a bonding process in which ion migration occurs due to heating and application of an external voltage, thereby causing attraction of the glass surfaces to be bonded. The attraction of opposing electrodes increases as their distance decreases. So, both surfaces are attracted by one another to get closer and closer until the point is reached at which the distance is so small that the surface atoms of the glasses form chemical bonds, although the actual reaction temperature for this has not yet been reached. After turning off the voltage and cooling, the two glass surfaces will no longer be separable from one another.

In the so-called optical contact bonding, direct adhesive adhesion of the superimposed surfaces is achieved. So, in particular, no adhesives or synthetic resins are employed. Molecular interaction between the two surfaces creates the adhesive force that bonds the cladding element to the element made of laser-active material.

The direct adhesive contact bonding may be mediated by a liquid. In the case of glasses, in particular water or in particular aqueous salt solutions are suitable for this purpose. The liquid on one or both surfaces is displaced during the optical contact bonding, and the surfaces adhere to one another directly adhesively in this case as well, while remaining sandwiched molecules of the liquid partially transfer the van der Waals forces that bond the two parts together.

Also, a temporary inverse pressure differential may promote the optical contact bonding. In other words, the cladding element may be sucked onto the element made of laser-active material by applying a negative pressure compared to the ambient pressure, for the purpose of optical contact bonding.

Alternatively or additionally, the optical contact bonding may as well be promoted or caused by temporary reverse charging of the two surfaces and thus by electrostatic attraction of the surfaces.

A subsequent process of thermal annealing may further enhance the bond between the two components subsequent to the optical contact bonding or anodic bonding.

Optical contact bonding is the presently preferred technique for bonding the cladding element to the element made of laser-active material.

According to a preferred embodiment of the invention, both the laser-active material and the cladding material are provided in the form of bodies exhibiting a root mean square (RMS) roughness, at least of their faces, of not more than 8 nm, not more than 4 nm, not more than 2 nm, more preferably not more than 1 nm, and most preferably of not more than 0.5 nm. In particular surfaces which are to be joined by bonding should advantageously have a low surface roughness.

BRIEF DESCRIPTION OF THE DRAWINGS

The invention will be explained in more detail below with reference to the accompanying figures in which the same reference numerals designate the same or equivalent elements, and wherein.

DETAILED DESCRIPTION

Each of FIGS. 1 to 7 schematically shows an exemplary embodiment of a laser device 1 according to the invention. In each case, the laser device 1 comprises an element 3 made of laser-active material, a pump light source (not shown) which emits pump light X, a laser light source (not shown) which emits laser light Y, and a resonator (not shown).

The element 3 made of laser-active material, preferably glass, more preferably phosphate glass, most preferably doped phosphate glass, emits laser light Y when being excited by pump light X.

Figure 1:
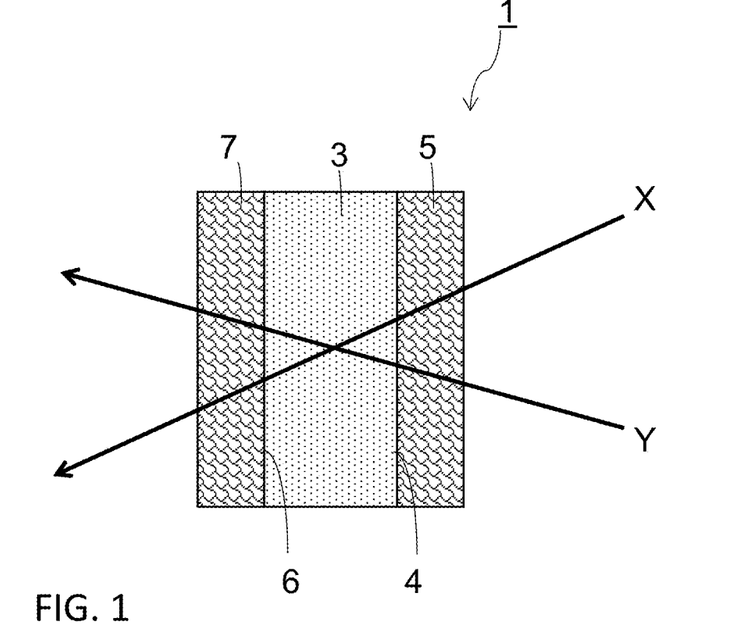
FIG. 1 shows a schematic drawing of a laser device according to the invention comprising two cladding elements.

FIG. 1 shows a laser device 1 in which the element 3 made of laser-active material is bonded to a first cladding element 5 on the pump light input side 4 and to a second cladding glass element 7 on the laser light exit side 6 of the element 3 made of laser-active material, so that heat exchange by heat conduction is made possible between the cladding elements 5, 7 and the element 3 made of laser-active material. In particular, the heat generated in the element 3 made of laser-active material is dissipated via cladding elements 5 and 7.

The laser device 1 of FIG. 1 is designed such that the pump light X can be directed through the first cladding element 5 and into the element 3 made of laser-active material, and such that the pump light X can be directed through the element 3 made of laser-active material and into the second cladding element 7.

In the exemplary embodiments, the cladding elements 5, 7 are preferably made of glass.

The glasses of cladding elements 5, 7 and of the element 3 made of laser-active material differ in that the cladding element 5 or 7 exhibits an absorption coefficient for the pump light X, which is lower than the corresponding absorption coefficient of the element 3 made of laser-active material. Thus, the laser device 1 allows for an undisturbed conduction of the laser light Y.

According to one embodiment, the element 3 made of laser-active material has the shape of a disk. The energy required for the generation of the laser light Y may be obtained by passing the pump light X through the laser disk several times, the disk usually having a thickness between 0.5 mm and 500 mm, preferably between 1 mm and 30 mm, more preferably between 1.5 and 15 mm.

In order to be effective as a heat sink, the cladding element 5 and 7 advantageously exhibits a greater thermal conductivity than air or than a protective gas. As a result, the heat is dissipated away from the element 3 made of laser-active material.

The cladding element 5 and 7 is thermally particularly advantageous if it exhibits at least a similar or preferably a higher heat capacity than the element 3 made of laser-active material.

For optimum bonding between the cladding element 5 or 7 and the element 3 made of laser-active material, the glasses of the cladding element 5 or 7 and of the element 3 made of laser-active material, i.e. the laser glass, advantageously have similar thermal expansion coefficients, preferably the difference is less than 20%, more preferably less than 10%.

In order to guarantee transparency for the laser light, the refractive index is preferably similar, that is to say a difference between the refractive indices of the glasses of the cladding element 5 and 7 and of the element 3 made of laser-active material is preferably less than 0.1, more preferably less than 0.05, and most preferably less than 0.002.

Advantageously, the cladding element 5 or 7 is bonded to the element made of laser-active material by optical bonding, in particular using an adhesive matched in the refractive index, preferably a two-component epoxy adhesive, or by anodic bonding, or by optical contact bonding.

With regard to thermal conductivity, the coefficient of thermal expansion, and the refractive index of the one or more cladding element(s) 5, 7 and of the element 3 made of laser-active material as well as their bonding, the laser devices 1 of FIGS. 2 through 7 are preferably configured similarly as in FIG. 1.

Figure 2:
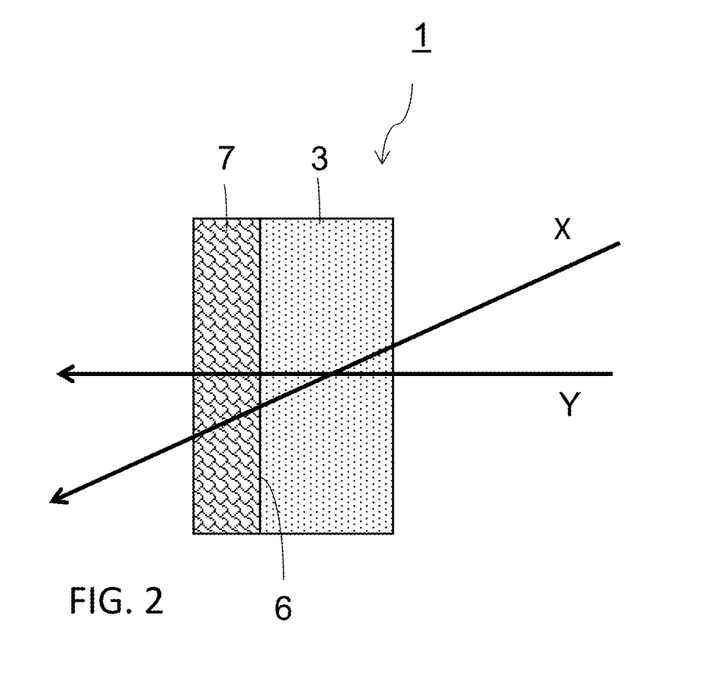
FIG. 2 shows a schematic drawing of a laser device according to the invention comprising one cladding element.

The laser device 1 of FIG. 2 is configured such that the pump light X can be directed through the element 3 made of laser-active material and into a cladding element 7, and the element 3 made of laser-active material is bonded to the cladding element 7 on its laser light exit side 6.

Figure 3:
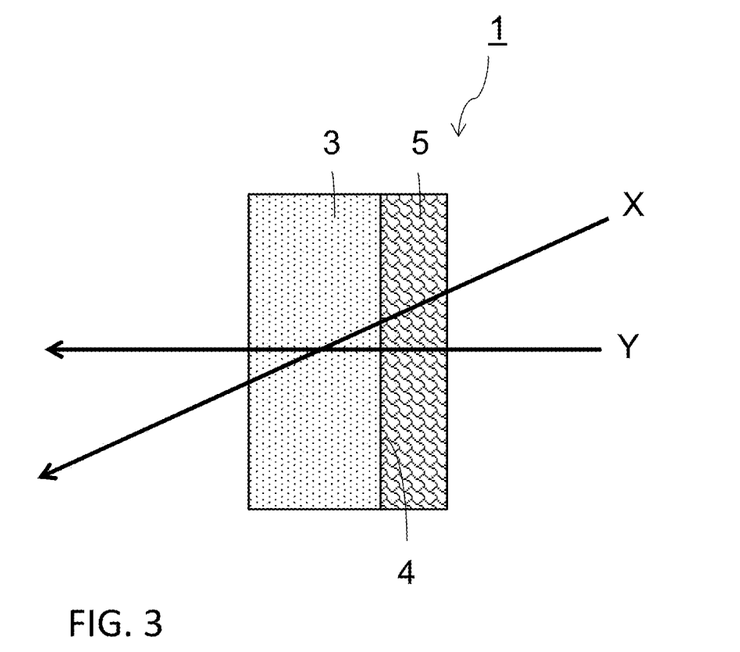
FIG. 3 shows a schematic drawing of an alternative laser device according to the invention comprising one cladding element.

FIG. 3 shows an alternative exemplary embodiment of the laser device 1 according to the invention, in which, unlike in FIG. 2, an element 3 made of laser-active material is bonded to a cladding element 5 on the pump light input side 4 of the element 3 made of laser-active material. Thus, the laser device 1 of FIG. 3 is configured such that the pump light X can be directed through the cladding element 5 and into the element 3 made of laser-active material, and the laser light Y exits from the element 3 made of laser-active material on the opposite side, i.e. laser light exit side 6.

Figure 4:
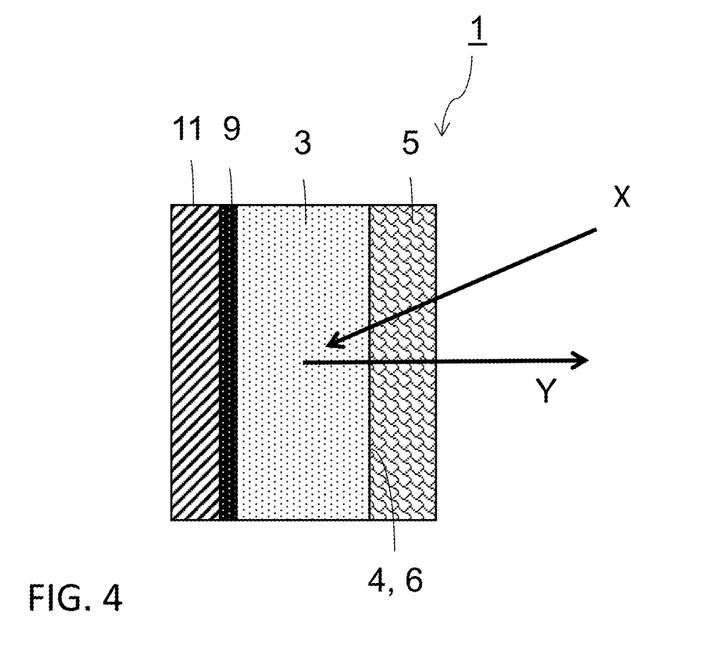
FIG. 4 shows a schematic drawing of a laser device according to the invention comprising a mirror, a metallic heat sink, and a cladding element.

FIG. 4 shows a further exemplary embodiment of a laser device 1 according to the invention, in which an element 3 made of laser-active material is directly bonded to a mirror 9 on a side facing away from the pump light input side 4 of the element 3 made of laser-active material, and to an additional metallic heat sink 11 adjacent to the mirroring face. On the pump light input side 4 of the element 3 made of laser-active material, which, because of the mirror 9, is at the same time the laser light exit side 6 of the element 3 made of laser-active material, the element 3 made of laser-active material is bonded to a cladding element 5. Thus, the laser device 1 of FIG. 4 is designed such that the pump light X can be directed through the cladding element 5 and into the element 3 made of laser-active material, and such that the laser light Y is deflected by the mirror 9 and can be directed through the element 3 made of laser-active material and through and out of the cladding element 5.

The additional metallic heat sink 11 is a spatially limited area or body which dissipates or transfers thermal energy stored therein or supplied thereto to an adjacent medium.

Adjacent media may be solid objects, liquids or gases.

In the case of a disk geometry of the element 3 made of laser-active material, the better cooling of the laser crystal is advantageous. If the thickness of the disk is smaller than the diameter thereof, heat dissipation occurs almost exclusively via the base surface of the disk. Thus, a temperature gradient is found almost exclusively perpendicular to the disk surface, but not in the plane of the disk. This leads to a reduction of the mechanical stresses arising during operation as a result of thermal expansion of the disk, which in other high-power solid-state lasers may have an adverse effect on beam quality or focusability.

Figure 5:
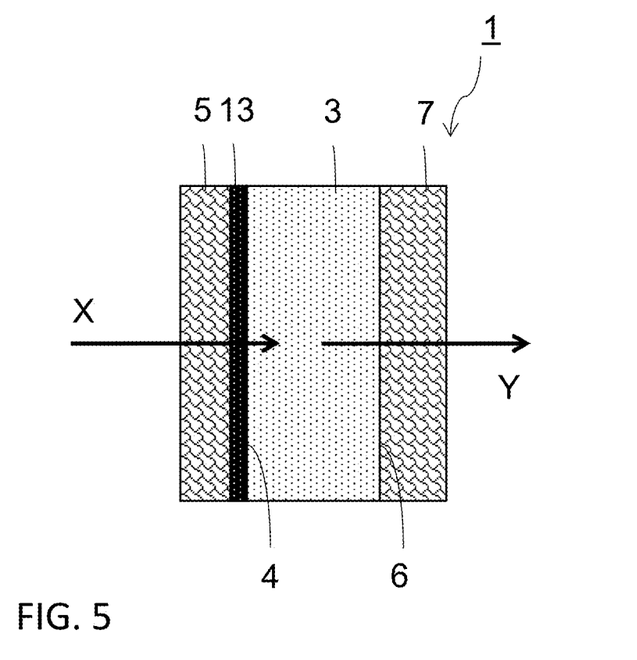
FIG. 5 shows a schematic drawing of a laser device according to the invention comprising a dichroic mirror and two cladding elements.

FIG. 5 shows an exemplary embodiment of a laser device 1 according to the invention, in which an element 3 made of laser-active material is directly bonded to a dichroic mirror 13 on the pump light input side 4 of the element 3 made of laser-active material, which dichroic mirror is transparent to the pump light X and reflective to the laser light Y, and in which a first cladding element 5 is provided adjacent to the dichroic mirror 13. Furthermore, the element 3 made of laser-active material is bonded to a second cladding element 7 on the laser light exit side 6 of the element 3 made of laser-active material.

Thus, the laser device 1 of FIG. 5 is designed such that the pump light X can be directed through the first cladding glass element 5 and through the dichroic mirror 13 and into the element 3 made of laser-active material, and such that the laser light Y can be directed through the element 3 made of laser-active material and into the second cladding element 7.

Figure 6:
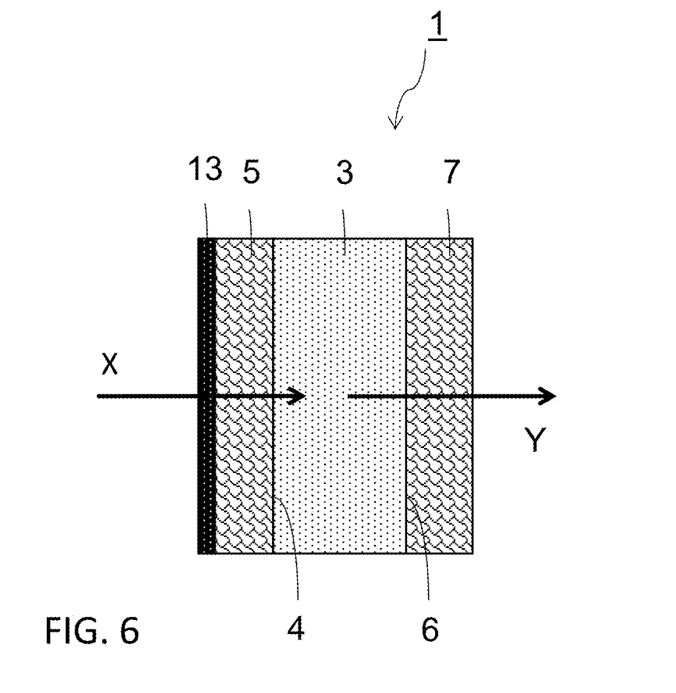
FIG. 6 shows a schematic drawing of an alternative laser device according to the invention comprising a dichroic mirror and two cladding elements.

FIG. 6 shows an exemplary embodiment of a laser device 1 according to the invention, in which an element 3 made of laser-active material is directly bonded to a first cladding element 5 and a dichroic mirror 13 adjacent thereto on the pump light input side 4, which dichroic mirror 13 is transparent to pump light X and reflective to laser light Y, and is bonded to a second cladding element 7 on the laser light exit side 6. Thus, the laser device 1 of FIG. 6 is configured such that the pump light X can be directed through the dichroic mirror 13 and through the cladding element 5 and into the element 3 made of laser-active material, and such that the laser light Y can be directed through the element 3 made of laser-active material and into the cladding element 7.

Figure 7:
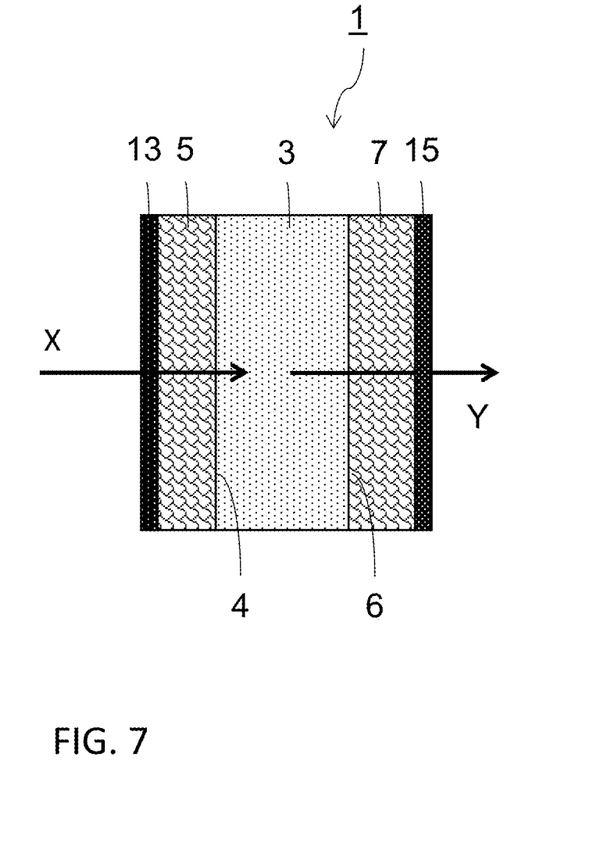
FIG. 7 shows a schematic drawing of a laser device according to the invention comprising two dichroic mirrors and two cladding elements.

FIG. 7 shows an exemplary embodiment of a laser device 1 according to the invention, in which an element 3 made of laser-active material is directly bonded to a first cladding element 5 on the pump light input side 4 of the element 3 made of laser-active material and to a dichroic mirror 13 adjacent thereto, which dichroic mirror 13 is transparent to pump light X and reflective to laser light Y, and is directly bonded to a second cladding element 7 and an adjacent dichroic mirror 15 on the laser light exit side 6 of the element 3 made of laser-active material, which dichroic mirror 15 is transparent to laser light Y and reflective to pump light X.

Thus, the laser device 1 of FIG. 7 is configured such that the pump light X can be directed through the dichroic mirror 13 and the cladding element 5 and into the element 3 made of laser-active material, and such that the laser light Y can be directed through the element 3 made of laser-active material and into the cladding element 7 and the dichroic mirror 15.

The laser devices 1 according to the invention preferably exhibit improved chemical resistance, in particular improved climate resistance and water resistance, compared to a simple phosphate-based laser glass.

Climate resistance describes the behavior of optical glasses under high relative humidity and temperatures between 40° C. and 50° C. In sensitive glasses, blotchy haze may appear on the surface, which usually cannot be removed by wiping.

For testing the glasses for climate resistance, a short-time procedure is employed, in which polished non-coated glass plates are exposed to an atmosphere saturated with water vapor under a temperature that changes every hour between 40° C. and 50° C. This creates a periodic alternation in moisture condensation on the glass surface and subsequent drying. After an exposure time of 30 hours, the glass plates are removed from the climatic chamber. The difference ΔH between transmission haze before and after the exposure is used as a measure for the surface changes that occurred in the form of blotchy haze. The measurements are carried out using a sphere hazemeter. The classification is based on the increase in transmission haze after 30 hours of exposure.

The classification of optical glasses into climate resistance classes (CR), CR 1 through CR 4, is listed in Table 1 below.

TABLE 1

| Climate resistance class CR | 1 | 2 | 3 | 4 |
|---|---|---|---|---|
| ΔH | <0.3% | ≥0.3% to <1% | ≥1% to <2% | ≥2% |

Glasses of climate resistance class CR 1 do not show any visible degradation after 30 hours of exposure to climate alternation. Under the usual humidity conditions during processing and storage of optical glasses of class CR 1, degradation of the surface does not have to be expected. By contrast, processing and storage of class CR 4 glasses should be carried out with particular care, since these glasses are extremely sensitive to climatic influences.

Table 2 below lists some glasses for the element 3 made of laser-active material, i.e. laser glasses, as well as glasses suitable for the one or more cladding element(s) 5, 7, and two crystals suitable for the one or more cladding element(s) 5, 7, together with their climate resistance (CR) class, their thermal conductivity, their thermal expansion coefficient, and their refractive index at selected laser wavelengths.

TABLE 2

| Glass | Laser wavelength [nm] | Climate resistance class CR | Thermal conductivity (25° C.) [W/mK] | Thermal expansion coefficient (−30/+70° C./ 20-40° C.) [$10^{-7}$/° C.] | Refractive index @ 1054 nm | Refractive index @ 1535 nm |
|---|---|---|---|---|---|---|
| LG940 | 1533 | 1-2 | 0.51 | 80.1 | | 1.522 |
| LG950 | 1534 | 4 | 0.63 | 108 | | 1.515 |

TABLE 2-continued

| Glass | Laser wave-length [nm] | Climate resistance class CR | Thermal conductivity (25° C.) [W/mK] | Thermal expansion coefficient (−30/+70° C./ 20-40° C.) [$10^{-7}$/° C.] | Refractive index @ 1054 nm | Refractive index @ 1535 nm |
|---|---|---|---|---|---|---|
| LG760 | 1054 | 2 | 0.57 | 125 | 1.508 | |
| N-PK51 | | 1 | 0.65 | 124 | 1.520 | 1.517 |
| N-BK7 | | 1 | 1.114 | 71 | 1.507 | 1.501 |
| N-PSK3 | | 3 | 0.99 | 62 | 1.541 | 1.536 |
| Crystal | | | | | | |
| $BaF_2$ | | 1 | 11.7 | 181 | 1.47 | 1.47 |
| $CaF_2$ | | 1 | 9.7 | 185 | 1.43 | 1.43 |

The glasses LG940 and LG950 are "eye-safe" phosphate laser glasses for 1.5 micrometer emission. These erbium-doped and ytterbium-doped phosphate glasses are intended for use in laser systems pumped by flash-lamps or diodes. They have very low refractive indices, good thermal properties and a very high emission cross section. Typical applications are laser distance measurements and medical lasers.

LG940 from SCHOTT AG is an erbium-ytterbium-chromium-cerium-doped phosphate laser glass.

LG950 from SCHOTT AG is a phosphate laser glass doped with erbium and ytterbium ions.

The glass LG760 from SCHOTT AG is a phosphate-based laser glass for high-power applications to meet the requirements of high-power solid-state laser systems. It has a large cross section and a low nonlinear refractive index. Furthermore, it is free of metallic platinum particles and other inclusions which could cause damage to the laser.

The phosphate crown glass N-PK51 from SCHOTT AG is a barium phosphate glass, the glass N-BK7 from SCHOTT AG is a borosilicate crown glass, and the phosphate dense crown glass N-PSK3 is also a barium phosphate glass from SCHOTT AG.

Borosilicate crown glass has a particularly high thermal conductivity coefficient and is therefore particularly suitable for a cladding element 5 or 7 for a laser device 1 according to the invention.

Thus, when bonded to an element 3 made of laser-active material, for example in the form of any one of the phosphate-based glasses listed in Table 2, the heat produced during operation of the laser device 1 can be removed particularly well from the element 3 made of phosphate laser glass.

Furthermore, a desired transparency for the laser light Y is guaranteed by the similar refractive indices of the assembly consisting of cladding element 5 or 7 and the element 3 made of laser-active material.

By virtue of the climate resistance class CR 1 of the borosilicate crown glass, this cladding element 5 or 7 is moreover capable of protecting, in a particularly effective way, an element 3 made of laser-active material and featuring a higher climate resistance class, such as LG950 or LG760, from detrimental climatic impacts.

The cladding element 5 or 7 may quite well also be made of phosphate glass, provided it is not actively doped, in particular with laser light emitting ions or pump light absorbing ions. Thus, in particular a phosphate crown glass such as, e.g., N-PK51, comes into consideration as a cladding element 5 or 7 for dissipating particularly well the heat resulting during operation of the laser device 1, away from an element 3 made of phosphate laser glass, in particular a phosphate glass doped with laser ions, such LG940 or LG950.

The cladding element 5 or 7 made of phosphate crown glass featuring climate resistance class CR 1 is also effective as a protection for the moisture-sensitive laser-active phosphate glasses of the element 3, such as LG940 or LG950.

Thus, depending on the field of application, various combinations of the glasses mentioned in Table 2 are possible for the element 3 made of laser-active material and for the cladding element 5 or 7 for heat dissipation and optionally additional climate resistance.

For optimum bonding between the at least one cladding element 5 or 7 and the element 3 made of laser-active material, the thermal expansion coefficients of the glasses of cladding element 5 and 7 and of the element 3 made of laser-active material, i.e. the laser glass, are advantageously similar. Preferably the difference is less than 20%, more preferably less than 10%. By way of example, a combination of the borosilicate crown glass N-BK7 as the cladding element 5 or 7 with the laser-active phosphate glass LG940 as the element 3 comes into consideration in this regard, or an assembly comprising the phosphate crown glass N-PK51 as the cladding element 5 or 7 and an element 3 made of LG760 or LG950.

Crystals such as $BaF_2$ or $CaF_2$ may also be used as a cladding to constitute a non-laser-active heat sink. They exhibit very good thermal conductivity. However, refractive index and coefficient of thermal expansion differ significantly.

It will be apparent to a person skilled in the art that the embodiments described above are given by way of example only, and that the invention is not limited thereto, rather they can be varied in various ways without departing from the scope of the claims.

Furthermore, it will be apparent that the features, whether disclosed in the specification, in the claims, or in the figures, define essential components of the invention also individually, even if described in conjunction with other features.

LIST OF REFERENCE NUMERALS

1 Laser device
3 Element made of laser-active material
4 Pump light input side of element 3
5 (First) cladding element
6 Laser light exit side of element 3
7 (Second) cladding element
9 Mirror
11 Metallic heat sink 13 Dichroic mirror transparent to pump light X and reflective to laser light Y
15 Dichroic mirror transparent to laser light Y and reflective to pump light X
X Pump light
Y Laser light

What is claimed is:

1. A laser device comprising:
an element made of laser-active material that emits laser light when excited by pump light, wherein the element is made of a glass; and
a cladding element bonded to the element so as to allow heat exchange by heat conduction between the cladding element and the element, wherein the cladding element is made of a material that comprises phosphate crown glass or phosphate dense crown glass and exhibits an absorption coefficient for the pump light that is lower than a corresponding absorption coefficient of the element, and
wherein the element and cladding element are configured so that the pump light is directed through the cladding element into the element and/or so that the pump light is directed through the element into the cladding element.

2. The laser device of claim 1, further comprising a difference in refractive indices of the material of the cladding element and the glass of the element that is less than 0.1.

3. The laser device of claim 1, further comprising a difference in refractive indices of the material of the cladding element and the glass of the element that is less than 0.05.

4. The laser device of claim 1, further comprising a difference in refractive indices of the material of the cladding element and the glass of the element that is less than 0.002.

5. The laser device of claim 1, wherein the cladding element has a thermal conductivity greater than that of air or of a protective gas.

6. The laser device of claim 1, wherein the cladding element has a thermal conductivity greater than that of the element.

7. The laser device of claim 1, wherein the element is doped with ions of one or more of elements selected from a group consisting of erbium, ytterbium, neodymium, chromium, cerium, and titanium.

8. The laser device of claim 1, wherein the cladding element is not doped with and does not contain laser light emitting ions or pump light absorbing ions.

9. The laser device of claim 1, wherein the material of the cladding element comprises fluorine ions.

10. The laser device of claim 1, wherein the material of the cladding element comprises a fluorine phosphate glass.

11. The laser device of claim 1, wherein the cladding element exhibits a laser damage threshold higher than that of the element.

12. The laser device of claim 1, further comprising a difference between thermal expansion coefficients of the material of the cladding element and the glass of the element that is less than 20%.

13. The laser device of claim 1, further comprising a difference between thermal expansion coefficients of the material of the cladding element and the glass of the element that is less than 10%.

14. The laser device of claim 1, wherein the cladding element is bonded to the element by optical contact bonding or by optical bonding or by anodic bonding.

15. The laser device of claim 1, wherein the cladding element further comprises a coating.

16. The laser device of claim 1, wherein the cladding element further comprises an anti-reflection coating.

17. The laser device of claim 1, wherein the element has a coating on a side facing away from the cladding element, the coating rendering the element at least partially reflective for the laser light or for the pump light or for both.

18. A laser device comprising:
an element made of laser-active material that emits laser light when excited by pump light, wherein the element is made of a glass; and
a cladding element bonded to the element by anodic bonding so as to allow heat exchange by heat conduction between the cladding element and the element, the cladding element being made of a material that comprises fluorine ions or comprises a fluorine phosphate glass and exhibits an absorption coefficient for the pump light that is lower than a corresponding absorption coefficient of the element, and
wherein the element and cladding element are configured so that the pump light is directed through the cladding element into the element and/or so that the pump light is directed through the element into the cladding element.

* * * * *